July 17, 1928.
C. H. HAPGOOD
THERMOSTATIC REGULATOR
Filed May 2, 1925
1,677,340
3 Sheets-Sheet 1
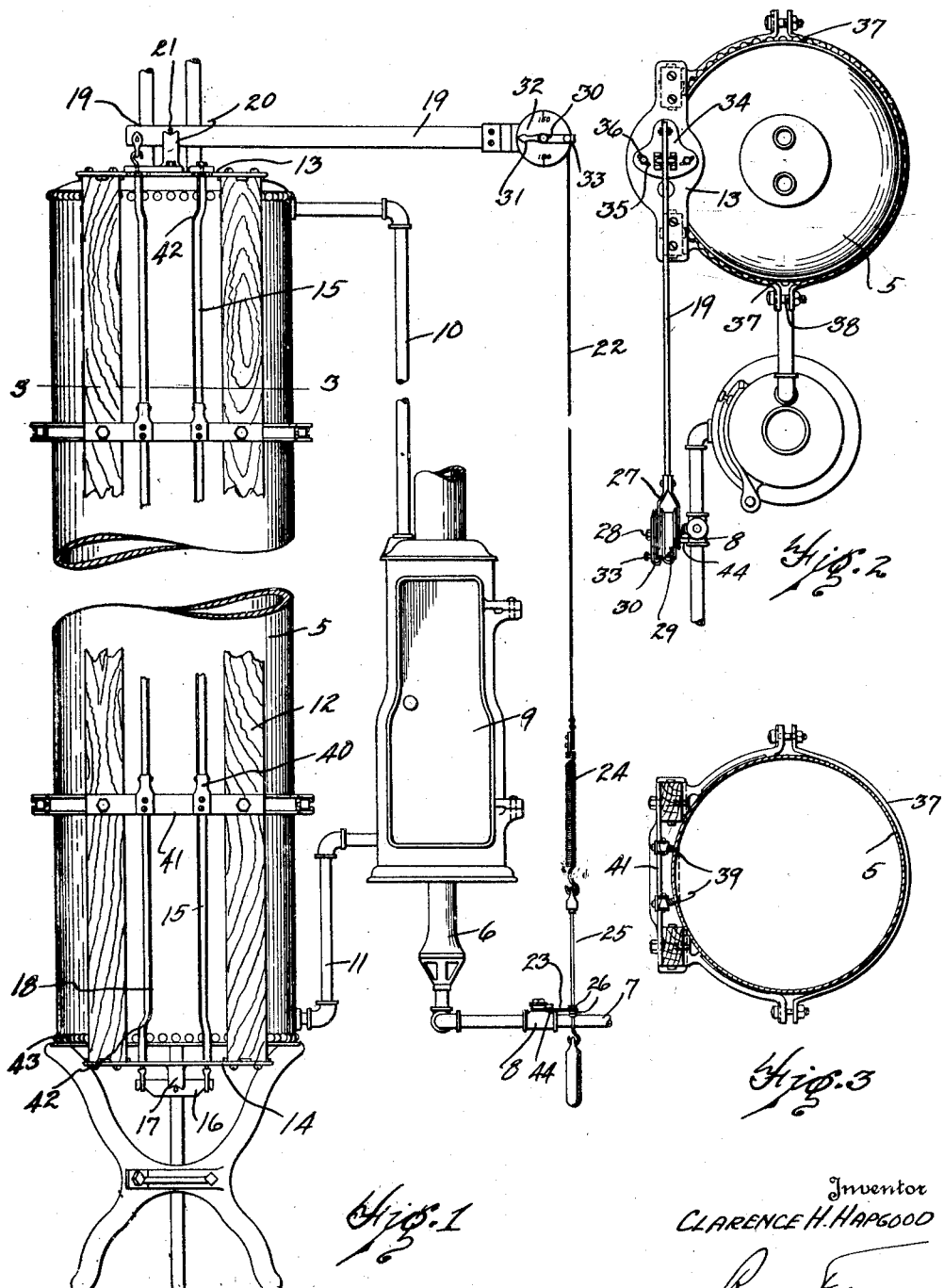
Inventor
CLARENCE H. HAPGOOD
By Rex Frye.
Attorney

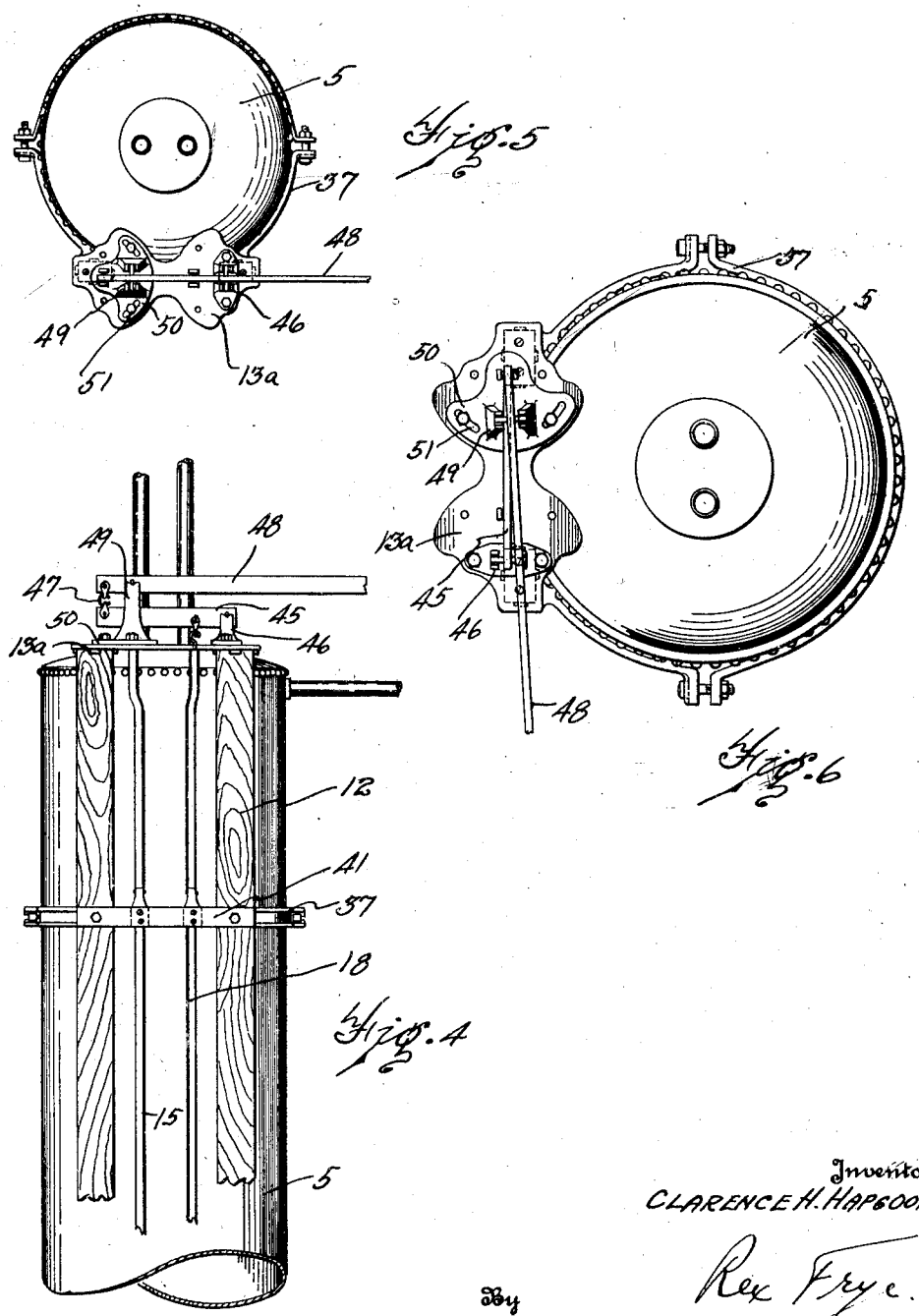

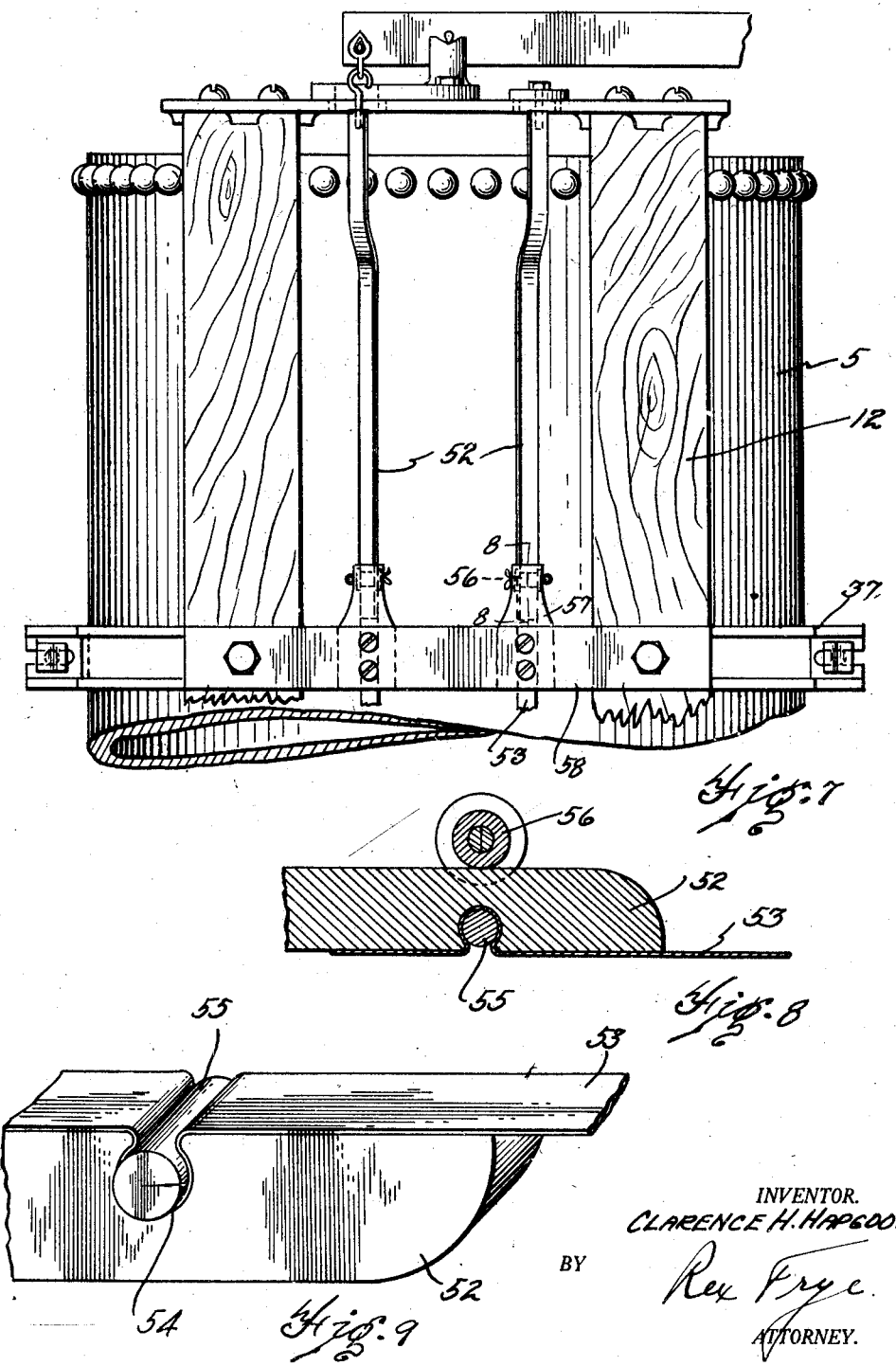

Patented July 17, 1928.

1,677,340

UNITED STATES PATENT OFFICE.

CLARENCE H. HAPGOOD, OF TOLEDO, OHIO, ASSIGNOR, BY MESNE ASSIGNMENTS, TO THE C. H. C. CO., OF TOLEDO, OHIO, A CORPORATION OF OHIO.

THERMOSTATIC REGULATOR.

Application filed May 2, 1925. Serial No. 27,358.

This invention relates to thermostatic regulators for water heaters and the like, and has for its principal object the provision of simple and effective means whereby the water may be automatically maintained at any desired temperature.

Another object of my invention is the arrangement of thermostatic regulating means on the exterior of a hot water container in position to quickly absorb heat from the interior thereof.

A further object of the invention is the mounting of manual adjusting means between the thermostat and the valve controlled thereby for setting my improved regulator to maintain the water, etc., to be heated at any desired temperature.

Other objects and advantages will be apparent from the following description, wherein reference is made to the accompanying drawings illustrating preferred embodiments of my invention and wherein similar reference numerals designate similar parts throughout the several views.

In the drawings:

Fig. 1 is a front elevation of my improved regulator mounted upon a hot water container such as is ordinarily used in dwellings.

Fig. 2 is a plan view thereof.

Fig. 3 is a detail section taken substantially on the line 3—3 of Fig. 1.

Fig. 4 is a detail front elevation of the upper portion of the hot water container with a slightly modified form of thermostatically controlled multiplying levers mounted thereon.

Fig. 5 is a plan view thereof.

Fig. 6 is an enlarged plan view similar to that shown in Fig. 5 but with the fulcrum for the upper multiplying lever in another adjusted position.

Fig. 7 is an enlarged detail view of the upper portion of the hot water container showing a slightly modified construction of the thermostat.

Fig. 8 is a detail section taken substantially on the line 8—8 of Fig. 7, and

Fig. 9 is a detail perspective view of the manner of securing the ribbon portion of the thermostat to the rigid end portions.

Referring now to the drawings, the numeral 5 designates a hot water reservoir of any desired size and contour adapted to contain the water to be heated by a burner 6 adapted to burn liquid or gaseous fuel supplied through the inlet pipe 7 in which is arranged a valve 8, which valve is adapted to be automatically opened or closed by means of my improved thermostatic regulator to control the admission of fuel to the burner 6. In Fig. 1 I have illustrated a conventional gas water heater 9 in which is preferably arranged a coil or the like through which the water to be heated circulates above the burner 6, the extremity of the coil being connected by the pipes 10 and 11 with the upper and lower extremities of the reservoir 5. It will be understood, however, that any desired form of heater may be utilized and that the construction of the heater forms no part of the present invention, which resides in the regulating means for controlling the admission of fuel to the burner 6.

A thermostat is secured upon the reservoir 5 and mounted so that the major portion of the heat responsive elements thereof are in contact with the exterior of the reservoir. In the embodiment illustrated in Figs. 1 to 6, the thermostat comprises a frame formed of side pieces 12 of wood or other relatively non-expansible material joined at their extremities by upper and lower cross bars 13 and 14 respectively. A metallic bar 15 is anchored at one extremity to the upper cross bar 13 and extends substantially the entire length of the reservoir 5 and is then connected with one arm of the lever 16, which is fulcrumed intermediate its ends upon the bearing 17 depending from the lower cross bar 14. The other arm of the lever 16 is connected with the lower extremity of a second metallic bar 18, extending substantially the entire length of the reservoir and is connected at its upper extremity with one arm of the multiplying lever 19, which is pivoted intermediate its ends upon the bearing 20 fixed upon the upper cross bar 13 of the thermostatic frame. Preferably the upper extremity of the metallic bar 18 is connected to the multiplying lever 19 comparatively close to its fulcrum pivot 21, while a flexible member 22 is connected to the extremity of the other arm of the multiplying lever at a comparatively great distance from the fulcrum pivot 21, whereby a relatively large multiplication of the movements of the thermostat is transmitted to the flexible member 22. By virtue of this mounting of the metallic bars 15 and 18, it will be seen that the expansion or contraction of the metallic rod 15 will serve to swing the lever 16 on its pivot and such motion will be transmitted to the metallic rod 18. In addition, this rod 18 will expand or contract simultaneously with the rod 15 with the result that substantially twice as much movement will be imparted to the multiplying lever 19 as was imparted to the connecting lever 16. As many metallic rods may be arranged with their extremities connected by levers similar to the connecting lever 16 as may be found necessary to impart sufficient movement to the endmost rod 18 to swing the multiplying lever 19 a sufficient distance to operate the thermostatic controlled valve 8 through the connecting member 22 when the temperature in the reservoir varies a sufficient number of degrees. The term "metallic rods or bars" as here used is meant to include any metallic heat responsive element or combination of elements which will expand or contract during changes in temperature in the reservoir 5 and transmit their collective movements to the multiplying lever 22.

The flexible member 22 is suspended from the multiplying lever 19 in a substantially plumb line, the free extremity of the multiplying lever being positioned so that it is substantially directly above the free extremity of the operating arm 23 of the valve 8. The lower extremity of the flexible member 22 carries a coil spring 24 to the lower extremity of which is suspended the weighted contact member 25. The shank of the weighted contact member 25 passes through an aperture in the free extremity of the operating arm 23 of the valve and preferably carries a pair of adjustable collars or nuts 26 which may be moved into engagement with the opposite faces of the operating arm 23. Upon the free extremity of the multiplying lever 19 is preferably arranged a pair of spaced bracket arms 27 (note Fig. 2) in which is journaled the shaft 28 of an adjusting roller 29 to the periphery of which is secured the upper extremity of the flexible member 22. Preferably the flexible member 22 extends over the major portion of the periphery of the roller 29 and is secured thereto at its extremity, whereby the rotation of the roller 29 in the proper direction will lengthen or shorten the effective length of the flexible member between the roller 29 and the operating arm 23 of the valve 8. Means are provided for manually rotating the roller 29 to effect desired adjustments in the effective length of the flexible member 22. As herein shown an adjusting arm 30 is secured upon the same shaft 28 that carries the roller 29, one extremity of the arm 30 being formed as a pointer 31 positioned to register with any of the graduations upon the graduated plate 32 fixed upon one of the bracket arms 27. Rotation of the adjusting arm 30 in either direction will move the pointer 31 over the graduated plate 32 and simultaneously rotate the roller 29 to change the effective length of the flexible member 22. Suitable means may be provided for locking the adjusting arm 30 in any adjusted position. As herein shown a set screw 33 is arranged between the adjusting arm 30 and graduated plate 32 to lock the arm in any angular position.

To permit the ready positioning of the free extremity of the multiplying lever 19 in substantially vertical alignment with the free extremity of the operating arm 23 of the valve 8, I preferably mount the bearing 20 upon which the pivot 21 of said lever fulcrums upon an adjustable plate 34 (note Fig. 2). The plate 34 is provided with an aperture for the passage of the upper extremity of the metallic rod 18 and a pair of arcuate slots 35 struck from the center of said aperture, whereby the plate 34 may be oscillated for the entire distance permitted by the slots 35 without changing the position of the aperture in the plate through which the extremity of the metallic rod 18 passes. A pair of bolts 36 extend through the slots 35 in the adjusting plate 34 and are suitably secured in the cross bar 13. By virtue of this construction the multiplying lever 19 may be swung through an arc so as to bring its free extremity directly above the operating arm 23 of the valve, and the thermostatic frame may be positioned upon the reservoir 5 so that the free extremity of the multiplying lever extends tangentially of the reservoir for a distance sufficient to permit the free end of the multiplying lever to be in a substantially plumb line with the free extremity of the operating arm. As herein shown I clamp the thermostatic frame on the reservoir 5 by means of substantially semi-circular clamping members 37 having outwardly projecting apertured extremities through which is adapted to pass adjusting bolts 38, whereby the clamping members may be firmly secured around the reservoir 5.

To aid in maintaining the major portion of the metallic rods of the thermostat in contact with the periphery of the reservoir 5, I preferably provide a plurality of tension rollers 39 (note Fig. 3) journaled in the free extremities of brackets 40 carried by cross bars 41 secured to the side pieces 12 of the thermostatic frame. If desired, the brackets 40 may be of resilient material to press the metallic rods 15 into engagement with the reservoir 5, or suitable means may be provided for adjusting the position of the rollers 39 toward or away from the reservoir. Moreover, I preferably bend the extremities of the metallic rods outwardly, as at 42 in Fig. 1, to permit them to clear the usual rivet heads 43 on the extremities of the water reservoirs utilized in dwellings, factories, etc. This permits the major portion of the metallic rods to engage the periphery of the reservoir 5 and still allow their free movement in response to temperature changes.

The operating arm 23 is preferably weighted so as to normally hold the valve closed whenever no lifting pressure is exerted against the operating arm by the contact member 25. I also provide a stop 44 on the valve casing to limit the upward swinging movement of the operating arm 23. After the movement of the multiplying lever 19 has swung the weighted contact member 25 upwardly to bring the operating arm 23 into engagement with the stop 44, further movement of the multiplying lever due to temperature changes in the thermostat will be absorbed by the coil spring 24 interposed between the flexible member 22 and the contact member 25.

In operation my improved regulator acts to maintain the valve 8 at the desired position to admit just enough gas to the burner 6 to heat the water in the container 5 to a desired temperature. When the water in the tank has reached approximately the temperature desired the expansion of the metallic rods of the thermostat will move the shorter arm of the multiplying lever 19 upwardly and so slacken the flexible member 22 to permit the weighted arm 23 of the valve to move the valve toward closed position. The valve is so constructed or seated that when moved toward closed position as far as permitted by the arm 23 there will still be a passageway for sufficient fuel to maintain a pilot light. When some of the water is withdrawn from the reservoir 5 cold water from the usual city reservoir will enter the tank 5 and so reduce the temperature of the water then contained therein. This lowering of the temperature in the tank will serve to contract the metallic rods of the thermostat and so swing the shorter arm of the multiplying lever 19 downwardly, whereby the opposite arm is swung upwardly to lift the operating arm 23 of the valve 8 and so admit more fuel to the burner 6 to quickly raise the temperature in the tank 5. As the temperature of the water in the tank again approaches the desired temperature, the metallic rods of the thermostat will again expand and slacken the flexible member 22 to again swing the valve toward closed position. When a different temperature is desired in the tank 5, the adjusting arm 30 is swung to bring its pointer 31 into registration with the indication on the plate 32 marked with the desired temperature, and then clampel in such position by the set screw 33. The movement of the adjusting arm 30 rotates the adjusting roller 29 to change the effective length of the flexible member 22.

In Figs. 4-6 I have illustrated a slightly different arrangement of the multiplying levers, a lower multiplying lever 45 being fulcrumed adjacent one extremity upon the bearing 46 carried upon the upper cross bar 13ª of the thermostat frame 12 and has its opposite extremity connected, as by the link 47 with the short arm of an upper multiplying lever 48, which is pivoted intermediate its ends upon the bearing 49 carried by an adjustable plate 50 adapted to be fixed upon the upper cross bar 13ª of the thermostat frame. The lower multiplying lever 45 is connected intermediate its ends with the upper extremity of the endmost metallic rod 18 of the thermostat, and this connection is preferably arranged comparatively close to the fulcrum pivot so that a comparatively great multiplication occurs in the lower multiplying lever which is communicated to the shorter arm of the upper lever 48 and again increased because of the relative lengths of the arms of the upper multiplying lever. The free extremity of the upper lever 48 is adapted to carry the bracket arms 27 in which is journaled the adjusting roller 29, as in the preceding embodiment. By virtue of this construction I am enabled to secure a larger movement of the adjusting roller 29 with smaller expansive or contractive movements of the thermostat bars, and at the same time provide a leverage arrangement that will not occupy an undue amount of space or force the positioning of the burner 6 at a relatively great distance from the tank 5. The adjustable plate 50 is arranged with arcuate slots 51 which permit the oscillation of the plate 50 without materially changing the position of the link 47, which is preferably located in vertical alignment with the center from which the arcuate slots 51 are struck. The shifting of the plate 50 permits the extension of the upper lever 48 at an angle to the lower lever 45 and so enables the convenient positioning of the free extremity of the lever 48 in vertical alignment with the operating arm 23 of the valve 8.

In Figs. 7 to 9 I have illustrated a slightly modified embodiment of the metallic rods of the thermostat. Each rod is formed with a rigid end portion 52, the outer extremity of which is either anchored or connected with one of the connecting levers 16 whereby the movements of adjacent metallic bars are transmitted, while the inner extremities of each end portion 52 are connected with a metallic ribbon 53. The ribbon 53 is much more quickly heated throughout and lengthened or shortened more quickly when the temperature in the tank 5 varies. The ribbon 53 is maintained in contact with the exterior of the tank 5 by virtue of the mounting arrangement illustrated in Figs. 7-9. The face of the end member 52 adjacent the tank 5 is provided with a notch leading into a tapered aperture 54 extending laterally through the end member 52, and the ribbon 53 is looped adjacent its extremities so that it extends through said notch into the aperture 54 and is secured in said aperture by means of the tapered pin 55 which is driven into the aperture 54 from one side of the end member. This locks the ribbon in position with its flat side against the inner face of the end member 52 and close to the exterior of the tank 5. A tension roller 56 may also be utilized to press the inner extremity of the end member 52 and ribbon 53 toward the tank 5. As herein shown the roller 56 is journaled in a bracket 57 secured to the cross bar 58 so that the roller presses the end member 52 toward the tank.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having thus described my invention, I claim:

1. The combination with a reservoir adapted to contain heated liquid, a burner arranged to supply heat to the liquid, and a valve for controlling the admission of fuel to the burner, of thermostatic means for controlling the valve comprising a substantially non-expansible frame adapted to be clamped around the exterior of the reservoir, metallic rods mounted upon the frame, connecting levers pivoted on the frame and arranged to transmit the expansive and contractive movements of one rod to its next adjacent rod, a multiplying lever fulcrumed upon the frame and arranged to be actuated by the movements of said rods, and operative connections between the multiplying lever and said valve for opening or closing the valve in accordance with the movements of said lever.

2. The combination with a reservoir adapted to contain heated liquid, a burner arranged to supply heat to the liquid, and a valve for controlling the admission of fuel to the burner, of thermostatic means for controlling the valve comprising a substantially non-expansible frame adapted to be clamped around the exterior of the reservoir, a metallic rod having one extremity fixed upon the frame, a second metallic rod freely movable upon the frame, a connecting lever pivoted on the frame and arranged to transmit the expansive and contractive movements of the rod to the free rod, a multiplying lever fulcrumed upon the frame and arranged to be actuated by the movements of the free rod, and a flexible member connecting the lever with said valve to open and close the valve in accordance with the changes in temperature of the liquid.

3. The combination with a reservoir adapted to contain heated liquid, a burner arranged to supply heat to the liquid, and a valve for controlling the admission of fuel to the burner, of thermostatic means for controlling the valve comprising a substantially non-expansible frame adapted to be clamped around the exterior of the reservoir, metallic rods mounted upon the frame, connecting levers pivoted on the frame and arranged to transmit the expansive and contractive movements of one rod to its next adjacent rod, a multiplying lever fulcrumed upon the frame and arranged to be actuated by the movements of said rods, means carried by the frame for horizontally adjusting said multiplying lever, a flexible member connecting the lever with said valve to open and close the valve in accordance with the changes in temperature of the liquid, and means carried by said lever for varying the effective length of the flexible member.

4. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, and means fixed upon the frame for pressing the rods into contact with the exterior of the tank.

5. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, and means fixed upon the frame for holding the rods in contact with the exterior of the tank including tension rollers contacting the metallic rods.

6. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, means fixed upon the frame for holding the rods in contact with the exterior of the tank, and means for changing the horizontal direction of said lever without impairing its operation by said metallic rods.

7. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, each metallic rod being constructed with rigid end portions and an intermediate flexible portion.

8. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, each metallic rod being constructed with rigid end portions and an intermediate flexible portion, and means carried by the frame for maintaining the flexible portions of the rod in contact with the exterior of the tank.

9. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, each metallic rod being constructed with rigid end portions and an intermediate flexible portion, and means engaging the rigid end portions of each rod for maintaining the flexible portions of the rods in contact with the exterior of the tank.

10. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, each metallic rod comprising rigid end portions having tapered apertures therein and an intermediate portion of metallic ribbon extending into said apertures in the end portions, and means for clamping said ribbons within said apertures.

11. In a thermostatic regulator for hot water tanks, a substantially non-expansible frame adapted to be clamped upon the tank, a plurality of interconnected metallic rods mounted upon the frame, a multiplying lever fulcrumed upon the frame so as to be swung in accordance with the collective movements of said rods, each metallic rod comprising rigid end portions having tapered apertures therein and an intermediate portion of metallic ribbon extending into said apertures in the end portions, and tapered pins extending through said apertures for clamping the ribbons to said end portions.

In witness whereof I hereunto set my hand.

CLARENCE H. HAPGOOD.